(12) United States Patent
Ford

(10) Patent No.: US 6,704,458 B2
(45) Date of Patent: Mar. 9, 2004

(54) METHOD AND APPARATUS FOR CORRECTING HEAVILY DAMAGED IMAGES

(75) Inventor: Gordon D. Ford, Round Rock, TX (US)

(73) Assignee: Eastman Kodak Company, Rochester, NY (US)

(*) Notice: Subject to any disclaimer, the term of this patent is extended or adjusted under 35 U.S.C. 154(b) by 163 days.

(21) Appl. No.: 09/735,118

(22) Filed: Dec. 12, 2000

(65) Prior Publication Data

US 2001/0031098 A1 Oct. 18, 2001

Related U.S. Application Data

(60) Provisional application No. 60/173,423, filed on Dec. 29, 1999.

(51) Int. Cl.[7] .................................................. G06T 5/00
(52) U.S. Cl. .................................. 382/275; 382/254
(58) Field of Search ................................ 382/275, 260, 382/261, 262, 264, 254; 356/237.1, 239.1, 239.7, 239.8, 237.2, 237.3

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | 358/75 |
| 4,302,108 A | 11/1981 | Timson | 356/359 |
| 4,462,860 A | 7/1984 | Szmanda | 156/626 |
| 4,670,779 A | 6/1987 | Nagano | 358/75 |
| 4,677,465 A | 6/1987 | Alkofer | 358/80 |
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |

(List continued on next page.)

FOREIGN PATENT DOCUMENTS

| | | | |
|---|---|---|---|
| DE | 28 21 868 A1 | 11/1979 | G01N/21/32 |
| DE | 19636867 | 9/1996 | |
| DE | 196 36 867 C1 | 1/1998 | H04N/5/21 |
| EP | 1 547 811 | 6/1979 | H04N/3/36 |
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |
| EP | 056914 | 11/1993 | |
| EP | 0 569 142 A1 | 11/1993 | H04N/5/253 |
| EP | 0624848 | 11/1994 | |

(List continued on next page.)

OTHER PUBLICATIONS

*New Adaptive Vector Filter Based on Noise Estimate*, Mei Yu, et al., IEICE Trans Fundamentals, vol. E82, No. 6, Jun., 1999.

(List continued on next page.)

*Primary Examiner*—Scott Rogers
(74) *Attorney, Agent, or Firm*—Dinsmore & Shohl; David A. Novais

(57) ABSTRACT

A system and method for correcting defects in images. A secondary defect map, defining heavily damaged portions of the image which were not corrected automatically, is generated. The secondary defect map allows the user to correct the defects by highlighting the uncorrected areas. Once the secondary defect map is generated, if the user selects the defect, it is filled in with a correction value obtained from surrounding "good" pixels only, rather than all the pixels—corrected and uncorrected—in a surrounding area.

16 Claims, 3 Drawing Sheets

U.S. PATENT DOCUMENTS

| | | | |
|---|---|---|---|
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,640,238 A * | 6/1997 | Nakano et al. | 356/237.3 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,808,674 A | 9/1998 | Adams, Jr. et al. | 348/273 |
| 5,875,040 A * | 2/1999 | Matraszek et al. | 358/1.9 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,014,471 A * | 1/2000 | Barkan et al. | 382/275 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |

FOREIGN PATENT DOCUMENTS

| | | | | |
|---|---|---|---|---|
| EP | 0 624 848 A2 | 11/1994 | | G06F/15/68 |
| EP | 0 699 753 A2 | 8/1995 | | H04N/1/407 |
| EP | 0 716 538 A2 | 6/1996 | | H04N/1/50 |
| EP | 0 751 670 A2 | 1/1997 | | H04N/1/10 |
| EP | 0 768 621 A2 | 4/1997 | | G06T/5/20 |
| EP | 0 794 454 A2 | 9/1997 | | G03B/27/73 |
| EP | 0 816 833 A2 | 1/1998 | | G01N/21/88 |
| EP | 0 816 833 A3 | 8/1998 | | G01N/21/88 |
| EP | 0 893 914 A2 | 1/1999 | | H04N/5/253 |
| GB | 2 283 633 A | 5/1995 | | H04N/5/262 |
| JP | 4-291139 | 10/1992 | | G01N/21/89 |
| JP | 11185028 | 7/1999 | | G06T/1/00 |
| JP | 2000-13604 | 1/2000 | | H04N/1/409 |
| JP | 2000-196813 A | 7/2000 | | |
| WO | WO 84/02019 | 5/1984 | | G06F/15/20 |
| WO | WO 89/06890 | 7/1989 | | H04N/3/36 |
| WO | WO 90/01240 | 2/1990 | | H04N/1/40 |
| WO | WO 91/09493 | 6/1991 | | H04N/5/127 |
| WO | WO 92/05469 | 4/1992 | | G03B/27/53 |
| WO | WO 95/15530 | 6/1995 | | G06F/17/14 |
| WO | WO 97/16028 | 5/1997 | | H04N/7/30 |
| WO | WO9831142 | 7/1998 | | |
| WO | WO 98/31142 | 7/1998 | | H04N/5/253 |
| WO | WO 98/34397 | 8/1998 | | |
| WO | WO 99/40729 | 8/1999 | | H04N/9/11 |
| WO | WO 01/48694 | 7/2001 | | G06T/5/00 |

OTHER PUBLICATIONS

*A Robust Method for Parameter Estimation of Signal–Dependent Noise Models in Digital Images*, B. Aiazzi, et al., IEEE, 1997, pp. DSP 97–601–601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Grayscale Characteristics*, Photographic Negatives The Nature of Color Images, pp. 163–168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc., http://www.asf.com/html/o_products/iceprod.html. Aug. 5, 1999.

*About Digital ICE Technology*, Applied Science Fiction, Inc., http://www.asf.com/html/o_products/icetech.html. Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp. 180–182.

* cited by examiner

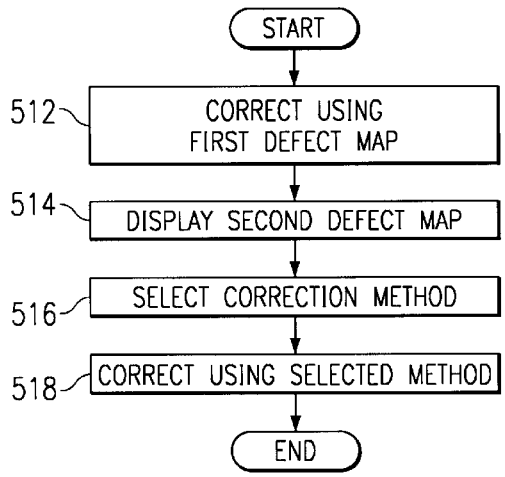
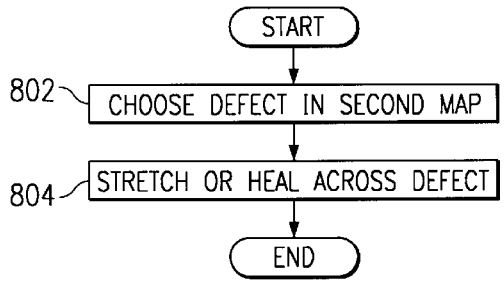
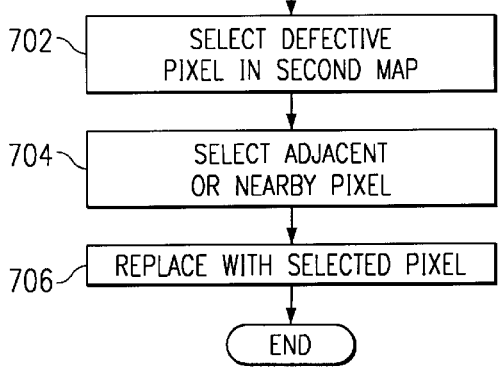
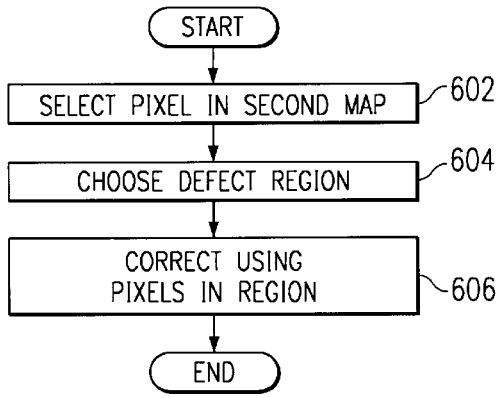
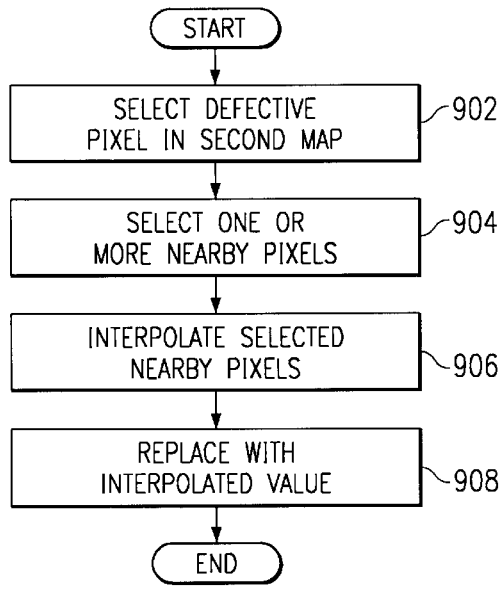
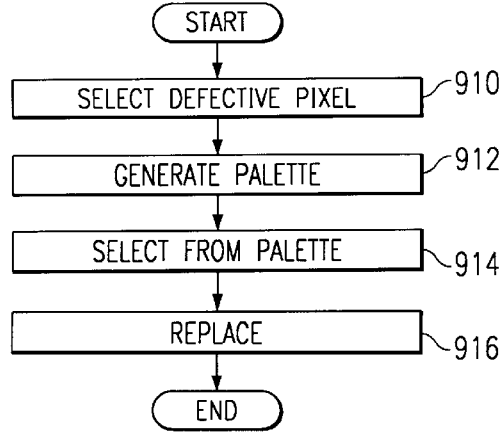

METHOD AND APPARATUS FOR CORRECTING HEAVILY DAMAGED IMAGES

RELATED APPLICATIONS

This application claims priority from U.S. Provisional Application Ser. No. 60/173,423 filed Dec. 29, 1999 under 35 U.S.C. §119(e). This application is related to U.S. patent application Ser. No. 09/735,238 filed Dec. 12, 2000, entitled "Method and Apparatus for Correcting Large Defects in Digital Images."

FIELD OF THE INVENTION

The present invention relates to image processing and, particularly, to an improved system and method for correcting defects in images.

DESCRIPTION OF THE RELATED ART

Digitized images often include imperfections that are not present in the original image. One cause of such defects may be the components of the image capturing system. For example, a scanning surface, or platen, may contain scratches and other optical path obstructions. These optical path obstructions are digitized along with the original image and appear as imperfections in the digitized image.

Another cause of imperfections is defects within the physical medium of the image. For example, a photograph, film negative, or other physical medium may be scratched or deformed despite careful handling. In addition, dust, hair, smudges, and the like may be deposited on the surface of the physical medium and will be digitized along with the original image. These defects will also appear in the digitized image as defects.

Conventional software programs are available to identify such defects. Such programs typically create "binary" defect maps that mark each pixel in the defect map as defective or non-defective. Other programs may also provide "continuous" defect maps, wherein each pixel is marked with a defect value proportional to the severity of any defect in the pixel.

Once a pixel has been marked as defective, conventional imaging programs replace the defective pixel with a replacement amplitude value determined from amplitudes of the surrounding pixels within a predetermined area. This interpolated value is then used to "fill" the defective pixel.

After such automatic image correcting systems have been run, there may remain certain defects which the system cannot correct. Such defects may, for example, be of such amplitude as to result from a hole in the film. Another conventional method of dealing with such defects is to allow the user to manually identify and manually fill in the remaining defective pixels. However, visual inspection can be unreliable, and defective pixels can be overlooked. Conventional defect correction programs thus have several technical disadvantages when applied to heavily damaged images.

SUMMARY OF THE INVENTION

These and other drawbacks in the prior art are overcome in large part by a system and method for correcting defects in heavily damaged images according to the present invention. In accordance with one implementation, a secondary defect map, defining heavily damaged portions of the image which were not corrected automatically, is generated. The secondary defect map allows the user to correct the defects by highlighting the uncorrected areas and applying a defect correction process to the uncorrected areas.

Thus, the defect correcting system and method provides an improved method for correcting heavily damaged images by automatically generating a defect map of those defects that are so severe that an automatic defect correction system cannot correct them. The defect correcting system and method then provides the user with various options for correcting the defects. These may include selection of a replacement value from a palette of values, interpolation between values, or stretching or healing across the defect region.

BRIEF DESCRIPTION OF THE DRAWINGS

A better understanding of the invention is obtained when the following detailed description is considered in conjunction with the following drawings, in which like reference numerals represent like features, in which:

FIG. 5 is a flowchart illustrating operation of an implementation of the present invention;

FIG. 6 is a flowchart illustrating operation of an implementation of the present invention;

FIG. 7 is a flowchart illustrating operation of an implementation of the present invention;

FIG. 8 is a flowchart illustrating operation of an implementation of the present invention;

FIG. 9 is a flowchart illustrating operation of an implementation of the present invention;

FIG. 10 is a flowchart illustrating operation of an implementation of the present invention.

DETAILED DESCRIPTION OF THE INVENTION

Figure 1:
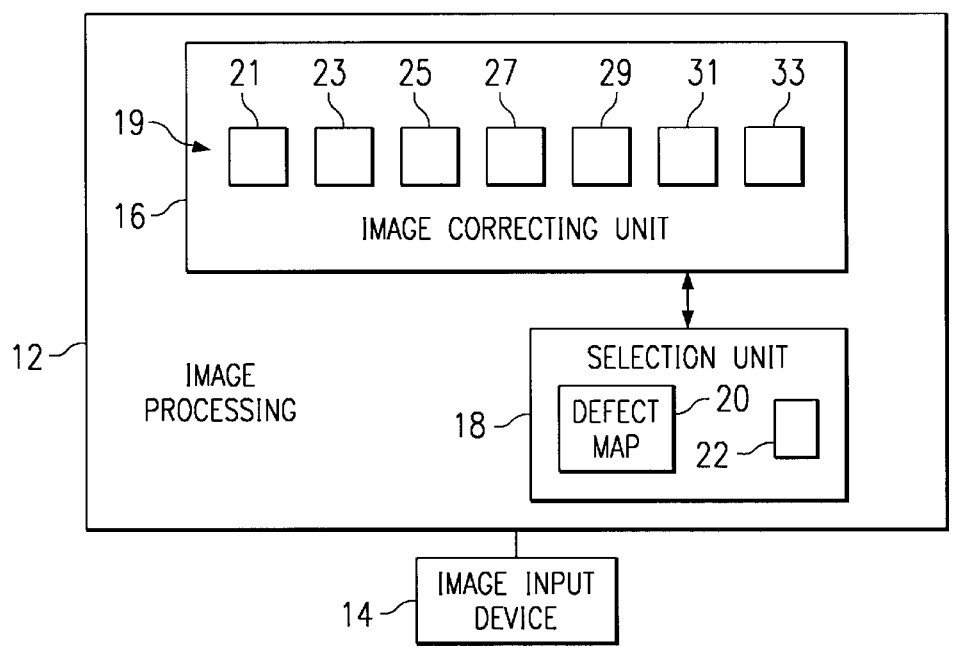
FIG. 1 is a block diagram of an imaging system employing an image correcting system in accordance with the present invention.

FIGS. 1–11 illustrate an image defect correcting system and method. As will be discussed in greater detail below, an image defect correcting system according to the present invention uses a defect map of heavily defective regions of an image and allows a user to correct them by choosing a defect correction process. In one embodiment, the defect correcting process comprises determining a correction value for each pixel in a region from values of "good" pixels surrounding it. Turning now to the drawings and, with particular attention to FIG. 1, an exemplary computer system 10 including image processing functionality according to the present invention is shown. The computer system 10 may be embodied as a known computer system, such as an IBM RS 6000 workstation, an IBM PC or PC-compatible computer, or an Apple G4 computer.

The computer system 10 implements an image processing system 12, such as a computer program stored in memory (not shown) and executable by one or more processors (not shown). The computer system 10 may further include an image input device 14. The image input device 14 may be embodied as a scanner or as any device suitable for providing an image to be processed.

The image processing system 12 includes an image correcting system 16, such as a computer program, in accordance with the present invention. As will be discussed in greater detail below, the image correcting system 16 uses a selection unit 18, including, for example, a defect map 20 for selecting a pixel for image correction. One method for generating a defect map is described in U.S. Pat. No. 5,266,805, which is hereby incorporated by reference in its entirety as if fully set forth herein. This method transmits infrared light at one surface of a film. A corresponding digitized infrared image is captured on this opposite side. Imperfections are identified because they substantially reduce or totally occlude the infrared image. The digitized infrared image thus provides an accurate map of the location and shape of image defects. Imperfections may then be corrected by simple correction techniques, such as interpolation.

Certain defects are of sufficient magnitude that they cannot be corrected adequately using simple techniques. As such, according to an implementation of the present invention, a second defect map 22 defining heavily defective pixels is generated, with the heavily defective pixels highlighted. A user interface (not shown) then gives the user the option of correcting the heavily defective pixels. If the user chooses to do so, the heavily defective pixels are corrected using a user defined heavily defective correction methods 19. The correction methods 19 include pixel stretching 21, healing 23, one-to-one replacement 25, defect region correction 27, interpolation 29, palette selection 31, cut-and-paste method 33 and the like. It is noted that other methods may be employed; the list is exemplary only.

Figure 2A:
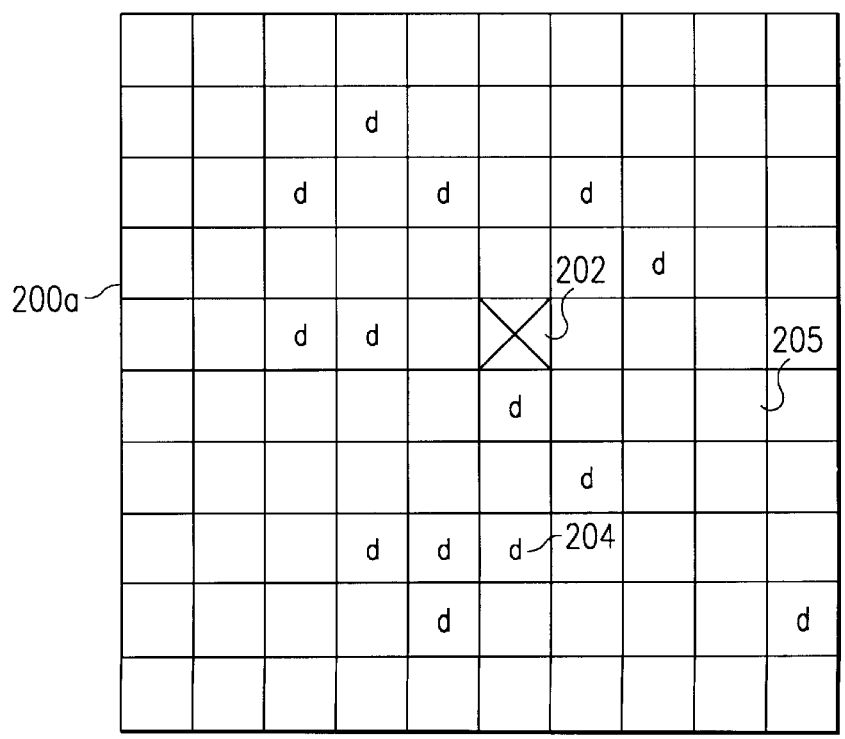
FIGS. 2A–2B are diagrams illustrating exemplary primary and secondary defect maps.

Operation is illustrated more clearly with reference to FIG. 2A. FIG. 2A illustrates a defect map 200a, with each square representing a pixel. A pixel of interest 202, which is to be corrected, is denoted X. Defective pixels 204 are denoted d. For example, a pixel may be identified as being defective if its defectiveness value exceeds a predetermined threshold. The remaining pixels 205 are non-defective.

The defective pixels 202, 204 are relatively small and may be corrected using a variety of simple image correcting techniques, such as Digital ICE™, available from Applied Science Fiction, Inc. Other methods are described in U.S. Pat. No. 6,614,946 issued Sep. 2, 2003, entitled "System and Method for Correcting Defects in Digital Images Using Selective Fill-In from Surrounding Areas," which is hereby incorporated by reference in its entirety as if fully set forth herein.

Figure 2B:
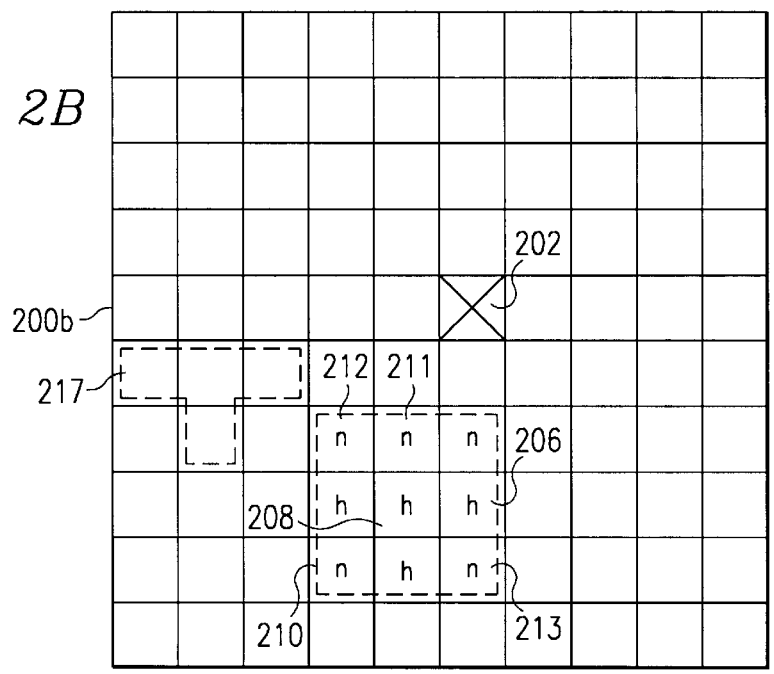

However, certain pixels may be so heavily defective that simple correction techniques do not correct them. That is, their level of defectiveness exceeds a predetermined threshold. An image correcting system according to an implementation of the present invention generates a secondary defect map 22 (FIG. 1) of such heavily defective pixels and allows a user to correct them. Such a defect map 200b is shown in FIG. 2B. Heavily defective pixels 206 are denoted h.

As will be explained in greater detail below, a variety of methods may be used to generate the secondary defect map 200b. In one embodiment, the secondary defect map 200b is generated at the same time the primary defect map 200a is generated, such as using a pixel by pixel defectiveness threshold comparison. In another embodiment, the secondary defect map 200b is generated after a first defect correcting method has been performed on the image data. More particularly, after such a program automatically corrects pixels which can be corrected, a number of heavily damaged pixels may remain uncorrected. The image correcting program identifies these pixels and generates the secondary defect map 22 therefrom. Once the secondary defect map 22 has been generated, the user may correct heavily damaged pixels 206 by selecting a defect correction method 14.

Another method is a replacement method 25, in which a value for the pixel 208 is obtained using a value from an adjacent or nearby non-defective pixel. For example, in FIG. 2B, the value for pixel 211 may be used to replace the pixel 208.

One such correction method is a stretching method 21 described in U.S. patent application Ser. No. 60/173,035 entitled "Method and Apparatus for Correcting Large Defects in Digital Images filed having a priority date of Dec. 23, 1999, which is hereby incorporated by reference herein. Another correction method is a healing method 23, as described in U.S. patent application Ser. No. 09/735,238 described above.

According to a surrounding area method 27, a replacement value is obtained using only pixels from a surrounding area that are themselves non-defective. For example, as shown in FIG. 2B, the user may select pixel 208. The image correcting system identifies a correction region 210 surrounding the pixel 208. Then, the replacement value is obtained using the values of pixels within the non-defective region 210. For example, the values of the non-defective pixels 212 may be averaged to obtain the replacement value for the pixel 208.

According to an interpolation method 29, a user may select a plurality of nearby pixels and have a replacement value obtained by an interpolation process. For example, in FIG. 2B, the user can select a pixel 211 and a pixel 213. An interpolation is performed on the selected pixels and a replacement value is obtained.

Using a palette method 31, a replacement value may be obtained using a palette of values (not shown). The user selects a value from the palette to replace the defective pixel.

Finally, using a cut-and-paste method 33, the user can select a region on the defect map 22, cut it, and move it to lie atop the defective region. For example, with reference to FIG. 2B, the user can select the region 217, cut it, and copy it over to overlie the defective pixels h of the defect region 210.

Figure 3:
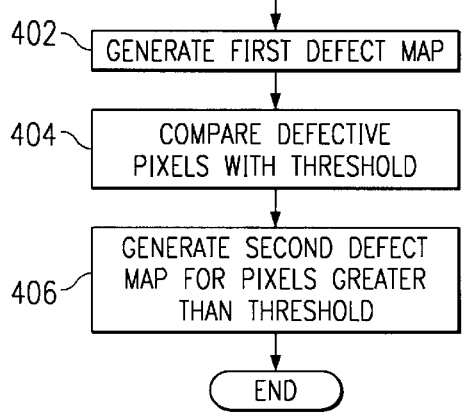
FIG. 3 is a flowchart illustrating operation of an implementation of the present invention.

Generation of the secondary defect map 22 according to one implementation of the invention is illustrated with reference to FIG. 3. In a step 402, a primary defect map 20 is generated by the selection unit 18. The primary defect map 20 is the defect map that will be initially used by the image correcting system 16. In a step 404, the image correcting system 16 compares defectiveness values for all the pixels in the defect map 20 to a threshold value. In a step 406, the image correcting system 16 and selection unit 18 generate the secondary defect map 22 using those pixels whose defectiveness was determined in step 404 to exceed the threshold value.

Figure 4:
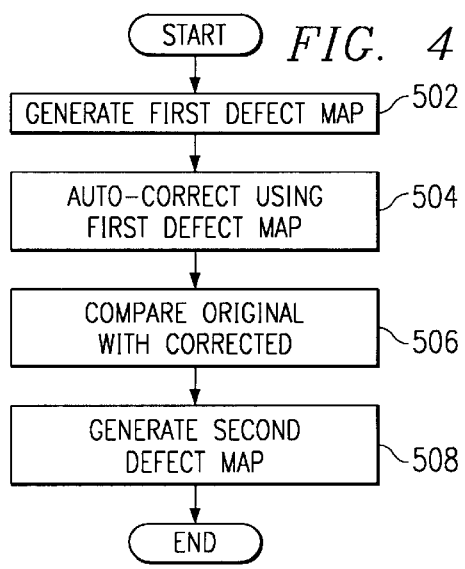
FIG. 4 is a flowchart illustrating operation of an implementation of the present invention.

An alternate method for determining the secondary defect map 22 according to an implementation of the present invention is shown with reference to FIG. 4. In a step 502, the selection unit 18 generates a primary defect map 20. In a step 504, the auto-correction process is run by the image correcting system 16. In a step 506, the image correcting system 16 determines which of the defective pixels have not been corrected. In a step 508, the image correcting system 16 and selection unit 18 generate the secondary defect map 22 using those pixels.

Operation of an implementation of the present invention is illustrated with reference to the flowchart of FIG. 5. In a step 512, the image correcting system 16 and selection unit 18 correct the image using a first defect map 20. In a step 514, the image correcting system 16 and selection unit 18 display the secondary defect map 22, identifying pixels which were not corrected on the first defect map 20. In a step 516, the user selects one of the correction methods 19 to use in correcting defects on the defect map 22. In a step 518, the image correcting system 16 uses the selected correction method 19 to correct the defects on the defect map 22. For example, FIG. 6 illustrates pixel replacement using the stretching and healing methods 21, 23 described above. In a step 802, a defect region is selected on the secondary defect map 22. In a step 804, the user selected stretching method 21 or healing method 23 is used to correct the defect.

FIG. 7 illustrates pixel replacement using the individual replacement method 25. In a step 702, the user selects a pixel on the secondary defect map 22 for replacement. In a step 704, the user selects a pixel whose value(s) will be used to replace the defective pixel. In a step 706, the defective pixel is replaced.

FIG. 8 illustrates a surrounding area method 27. In a step 602, a user selects a pixel on the secondary defect map 22. In a step 604, the image correcting system 16 and selection unit 18 define a correction region around the defective pixel. In a step 606, the defective pixel is corrected using values derived from the pixels in the correction region.

FIG. 9 illustrates an interpolation method 29. In a step 902, a user selects a defective pixel in the secondary defect map 22 for correction. In a step 904, the user selects one or more other pixels to be used for correction. In a step 906, an interpolation is performed on the selected pixels to obtain a single value. In a step 908, the value is used to replace the defective pixel.

FIG. 10 illustrates a palette method 31. In a step 910, a user selects a pixel for correction in the secondary defect map 22. In a step 912, the image correcting system generates a palette of replacement values. For example, the palette may show colors of pixels that are located near the defective pixel. In a step 914, the user selects a value from the palette. In a step 916, the value is used to replace the defective pixel.

Figure 11:
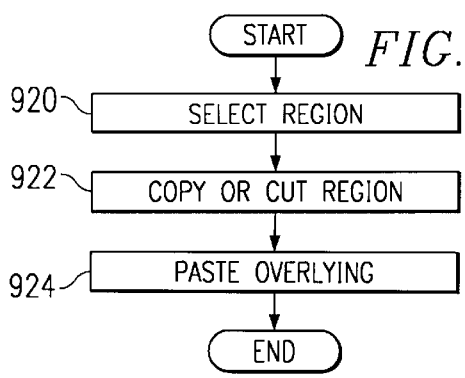
FIG. 11 is a flowchart illustrating operation of an implementation of the present invention.

A cut-and-paste method 33 is shown in FIG. 11. In a step 920, a user selects a replacement region 217 (FIG. 2B). In a step 922, the user copies or cuts the region 217. In a step 924, the region is positioned to overlie a defective region.

The invention described in the above detailed description is not intended to be limited to the specific form set forth herein, but is intended to cover such alternatives, modifications and equivalents as can reasonably be included within the spirit and scope of the appended claims. To aid the Patent Office and any readers of any patent issued on this application in interpreting the claims appended hereto, applicants wish to note that they do not intend any of the appended claims to invoke paragraph 6 of 35 U.S.C. Sec. 112 as it exists on the date of filing hereof unless the words "means for" or "step for" are used in the particular claim.

What is claimed is:

1. A method, comprising:
   providing an image correcting system for correcting an image using a first defect map;
   providing a selection unit for displaying a second defect map of pixels that were not corrected using said first defect map; and
   providing a method for selecting one or more defective pixels in said second defect map for correction.

2. A method according to claim 1, including providing a method for using values of nondefective pixels within a correction region surrounding said one or more defective pixels to obtain a replacement value for said one or more defective pixels.

3. A method according to claim 2, said displaying a second defect map comprising comparing one or more pixels in said first defect map with a threshold value.

4. A method according to claim 2, said displaying a second defect map comprising determining which pixels on said first defect map were not corrected using said first defect map.

5. A method for correcting an image, comprising:
   generating a primary defect map to correct an image; and
   displaying a secondary defect map which defines pixels of the image that were not corrected using the primary defect map.

6. A method for correcting an image; comprising:
   displaying a secondary defect map of pixels that were corrected using a primary defect map; and
   using values of nondefective pixels within a correction region surrounding one or more defective pixels on said secondary defect map to obtain a replacement value for said one or more defective pixels.

7. A method for correcting an image, comprising:
   displaying a secondary defect map of pixels that were corrected using a primary defect map;
   said displaying a secondary defect map comprising comparing one or more pixels in said primary defect map with a threshold value.

8. A method according to claim 5, said displaying a secondary defect map comprising determining which pixels on said primary defect map were not corrected using said primary defect map.

9. A system for correcting an image, comprising:
   an image input device;
   an image correcting system adapted to correct said image using a first defect map;
   a selection unit configured to display a second defect map of pixels that were not corrected using said first defect map;
   wherein said selection unit is further configured to select one or more defective pixels in said second defect map for correction.

10. A system according to claim 9, said image correcting system configured to use values of nondefective pixels within a correction region surrounding said one or more defective pixels to obtain a replacement value for said one or more defective pixels.

11. A system according to claim 10, said selection unit adapted to compare one or more pixels in said first defect map with a threshold value.

12. A system according to claim 9, said selection unit configured to determine which pixels on said first defect map were not corrected using said first defect map.

13. A system comprising:
   a selection unit adapted to display a secondary defect map of pixels that were not corrected using a primary defect map; and
   a user interface operable to receive instructions from a user for choosing a user correction method for correcting the pixels of the secondary defect map.

14. A system according to claim 13, wherein the user correction method comprises using values of nondefective pixels within a correction region surrounding one or more defective pixels on said secondary defect map to obtain a replacement value for said one or more defective pixels.

15. A system according to claim 14, said selection unit adapted to compare one or more pixels in said primary defect map with a threshold value.

16. A system according to claim 14, said selection unit adapted to determine which pixels on said primary defect map were not corrected using said primary defect map.

* * * * *